O. REHSE.
SCREW.
APPLICATION FILED FEB. 18, 1908.

924,273.

Patented June 8, 1909.

WITNESSES
Edward Thorpe.
John K. Brachvogel

INVENTOR
Otto Rehse
BY Munn & Co
ATTORNEYS.

UNITED STATES PATENT OFFICE.

OTTO REHSE, OF GERMANTOWN, CALIFORNIA.

SCREW.

No. 924,273.　　　　Specification of Letters Patent.　　　Patented June 8, 1909.

Application filed February 18, 1908.　Serial No. 416,449.

*To all whom it may concern:*

Be it known that I, OTTO REHSE, a citizen of the United States, and a resident of Germantown, in the county of Glenn and State of California, have invented a new and Improved Screw, of which the following is a full, clear, and exact description.

This invention relates to screws which have the threads discontinuous, so that cutting faces are provided transversely of the threads, which serve to bore or drill an opening for the screw, and at the same time to tap or thread the opening.

An object of the invention is to provide a simple and inexpensive screw for wood-work and the like, which can be worked without difficulty, and which largely obviates the danger of splitting the wood.

The invention consists in the construction and combination of parts, to be more fully described hereinafter and particularly set forth in the claim.

Reference is to be had to the accompanying drawings forming a part of this specification, in which similar characters of reference indicate corresponding parts in both views, and in which—

Figure 1:
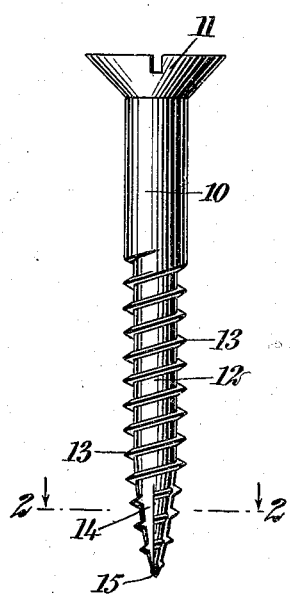
Figure 2:
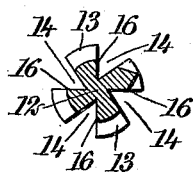

Figure 1 is a side view of a screw showing my invention applied thereto; and Fig. 2 is an enlarged transverse section on the line 2—2 of Fig. 1.

Before proceeding to a more detailed explanation of my invention, it should be understood that while the same is particularly useful in connection with screws for carpentry, cabinet-making and other wood-work, it can also be advantageously applied to screws for other purposes. When a screw is started, the taper of the same tends to force the wood apart and to split it. Furthermore there is often considerable difficulty in starting screws, particularly in hard wood and other materials which strongly resist the entrance of the screw. I provide a screw tapered to a point and having threads of any preferred or common form, but which, near the point, has longitudinal grooves which render the threads discontinuous and form cutting faces at the same. These cutting faces act as do those of a male die or tap. They bore or drill an opening for the entrance of the screw, while at the same time this opening is threaded by the discontinuous thread sections. The action of the screw therefore, in entering the material, is similar to the action of a boring bit and a threading tap. Consequently, the screw can be readily inserted even in the hardest wood, and practically obviates the danger of splitting the material.

I preferably provide the screw with grooves of the form shown, for example, in the accompanying drawings, in which four grooves are used and in which each forms, at the thread sections, cutting faces, which are at substantially right angles and which lie in planes passing through the longitudinal axis of the screw.

Referring more particularly to the drawings, 10 represents the body of the screw which may be of any preferred or common form. It has, for example, the kerfed head 11, and the tapered portion 12 provided with threads 13. Near the point 15, the screw has grooves 14 arranged longitudinally of the screw and extending to the point. The grooves are preferably V-shaped in cross section and each has one side 16 arranged in a plane passing through the longitudinal axis of the screw body. The sides 16 of the opposite grooves are alined and lie in a single plane, which of course, passes through the longitudinal axis of the screw. The grooves lie at an angle with respect to the longitudinal axis of the screw body, which is greater than the angle of taper of the screw point. Consequently, the grooves which start at the point, gradually decrease in depth, and a short distance from the point, merge into the surface of the screw and cease. The length of the grooves forms no part of my invention, but it may be varied to suit special conditions and individual preference.

Having thus described my invention, I claim as new, and desire to secure by Letters Patent:—

A screw comprising a body portion having a thread extending to its point and provided with a plurality of V-shaped grooves extending from the point to about the junction of the said point with the body, the grooves being oppositely arranged and gradually increasing in width from their lower to their upper ends and merging at the upper and wider ends into the body, one of the sides of the opposite grooves being in alinement and in a plane passing through the longitudinal axis of the body and the other sides of said grooves being out of alinement and in planes passing on opposite sides of the said axis.

In testimony whereof I have signed my name to this specification in the presence of two subscribing witnesses.

OTTO REHSE.

Witnesses:
  H. H. REHSE,
  T. J. HICKS.